(12) United States Patent
Alvarez et al.

(10) Patent No.: US 9,538,423 B2
(45) Date of Patent: Jan. 3, 2017

(54) ROUTING PACKET TRAFFIC USING HIERARCHICAL FORWARDING GROUPS

(71) Applicant: Cisco Technology, Inc., San Jose, CA (US)

(72) Inventors: Santiago Alvarez, Mountain View, CA (US); Sami Boutros, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 251 days.

(21) Appl. No.: 14/070,462

(22) Filed: Nov. 1, 2013

(65) Prior Publication Data

US 2015/0124606 A1    May 7, 2015

(51) Int. Cl.
*H04L 12/801* (2013.01)
*H04W 28/08* (2009.01)
*H04L 12/715* (2013.01)

(52) U.S. Cl.
CPC ............ *H04W 28/085* (2013.01); *H04L 45/46* (2013.01)

(58) Field of Classification Search
None
See application file for complete search history.

(56) References Cited

U.S. PATENT DOCUMENTS

2012/0082073 A1*  4/2012  Andreasen .......... H04L 12/4633
                                                        370/310
2012/0213225 A1*  8/2012  Subramanian ........ H04L 45/586
                                                        370/392

FOREIGN PATENT DOCUMENTS

JP          EP 2637363 A1 *  9/2013  ............. H04L 45/64

* cited by examiner

*Primary Examiner* — Yemane Mesfin
*Assistant Examiner* — Jeff Banthrongsack
(74) *Attorney, Agent, or Firm* — Hickman Palermo Becker Bingham LLP (57) ABSTRACT

Routing packet traffic using hierarchical forwarding groups is disclosed. In an embodiment, a packet is received at a packet router. Data related to the packet is received at a first forwarding group. Based on a first forwarding policy associated with the first forwarding group, a particular second forwarding group is selected from a set of forwarding groups that are members of the first forwarding group. Each forwarding group of the set of forwarding groups that are members of the first forwarding group is associated with a unique set of paths. Data related to the packet is provided to the particular second forwarding group. Based on a second forwarding policy associated with the particular second forwarding group, a particular path is selected from a set of paths that are associated with the particular second forwarding group. The packet is forwarded to a network node via the particular path.

22 Claims, 7 Drawing Sheets

ROUTING PACKET TRAFFIC USING HIERARCHICAL FORWARDING GROUPS

TECHNICAL FIELD

The present disclosure generally relates to routing packets in telecommunications networks. The disclosure relates more specifically to techniques for selecting a network path for forwarding packets.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Entities such as business enterprises often obtain video, voice and data networking services from network service providers. A service provider typically enters into a contractual agreement with a customer that elects to use the service provider's network for sending and receiving packets. An example of such a contract is a Service Level Agreement. The contract outlines the terms the service provider must meet while transmitting the customer's packet traffic over the service provider's network. The service provider typically meets the terms of the contract by classifying packet traffic flowing through its network into various classes and designates a path for each class.

Packet traffic classification is typically dependent upon quantitative or statistical attributes of paths such as throughput, delay, jitter and/or loss. Additionally, relative attributes such as a packet's priority of access to network resources may also be used. Once a packet has been classified, the service provider routes that packet through its network via the path designated for the packet's class.

Present approaches for classifying packet traffic are typically coarse and face scalability issues as the size of the network grows. They do not provide the capability to achieve a finer level of packet traffic classification that is desired to accommodate modern application requirements and customer expectations nor the flexibility required to manage a network with such level of packet traffic classification.

DESCRIPTION OF EXAMPLE EMBODIMENTS

Routing packet traffic using hierarchical forwarding groups is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 Overview
2.0 Structural and Functional Overview
3.0 Method of Routing Packet Traffic Using Hierarchical Forwarding Groups
4.0 Other Disclosure
5.0 Implementation Mechanisms-Hardware Overview
6.0 Extensions and Alternatives 1.0 Overview Routing packet traffic using hierarchical forwarding groups is described. In an embodiment, a method is described for forwarding packets in a network that comprises in part mapping individual services to individual paths. In an embodiment, a packet is received at a router that comprises logic configured to manage hierarchical forwarding groups. A forwarding group at a first level of a hierarchy ("first forwarding group") selects a forwarding group at a second level of hierarchy ("second forwarding group"), based on an analysis of a forwarding policy associated with the first forwarding group and certain attributes associated with the data. The second forwarding group is selected from a set of forwarding groups that are members of the first forwarding group. The second forwarding group then selects a path, based on an analysis of a forwarding policy associated with the second forwarding group and certain attributes associated with the data. Packets are forwarded to a network node via the selected path.

In other aspects, the invention encompasses a computer apparatus and a computer-readable medium configured to carry out the foregoing steps.

2.0 Structural and Functional Overview

Certain embodiments eliminate the inflexibility of a single level of traffic classification. In an embodiment, by utilizing a multi-level classification approach where incoming packets are classified by multiple forwarding groups of a hierarchical set of forwarding groups, a service provider may more finely control the path through which a customer's traffic is routed. For example, a customer may send two different types of traffic through a service provider's network, such as layer 3 VPN traffic that provides Voice over Internet Protocol (VoIP) service from its media gateway and another layer 3 VPN traffic for a lower grade service, which is not as important to the customer as the traffic from the media gateway. The customer may desire for the traffic from the media gateway to be routed via only paths that have been traffic engineered to handle packets that are sensitive to delay and loss, and may desire to route the layer 3 VPN traffic for the lower grade service to a non-traffic engineered path as the customer is comfortable with such traffic to experience normal delay or packet loss. Additionally, the traffic from the media gateway generates voice traffic and signaling for the voice, and the customer may further desire to route each one of these through a different traffic engineered tunnel.

In an embodiment, the service provider can achieve such a routing of the customer's layer 3 VPN traffic through its network. For example, the service provider may classify layer 3 VPN traffic from the media gateway and the layer 3 VPN traffic for the lower grade service into different classes by defining the forwarding policy associated with the first forwarding group to specify a second forwarding group based on information related to control plane architecture that can differentiate between the two types of layer 3 VPN traffic. The first forwarding group analyzes the associated forwarding policy against relevant attributes of an incoming packet and as a result selects the specified second forwarding group. After this initial classification, the service provider may route layer 3 VPN traffic from the media gateway separately from layer 3 VPN traffic for the lower grade service. However, stopping the classification of traffic at this level may be insufficient to realize the customer's desire to route the voice traffic of the media gateway traffic to a particular traffic engineered tunnel and the traffic for the signaling for the voice to a different traffic engineered tunnel.

Therefore, the service provider may further classify the media gateway traffic into two different classes, one for voice traffic and another for signaling for the voice, by defining the forwarding policy associated with the second forwarding group to specify forwarding group members based on a value in a field of a packet. The second forwarding group may be associated with a set of traffic engineered paths. The second forwarding group analyzes the associated policy against the value in the incoming packet and accordingly selects a particular traffic engineered path from the set of traffic engineered paths associated with the second forwarding group.

Hierarchical forwarding groups may be implemented with any number of hierarchy levels.

Figure 1A:
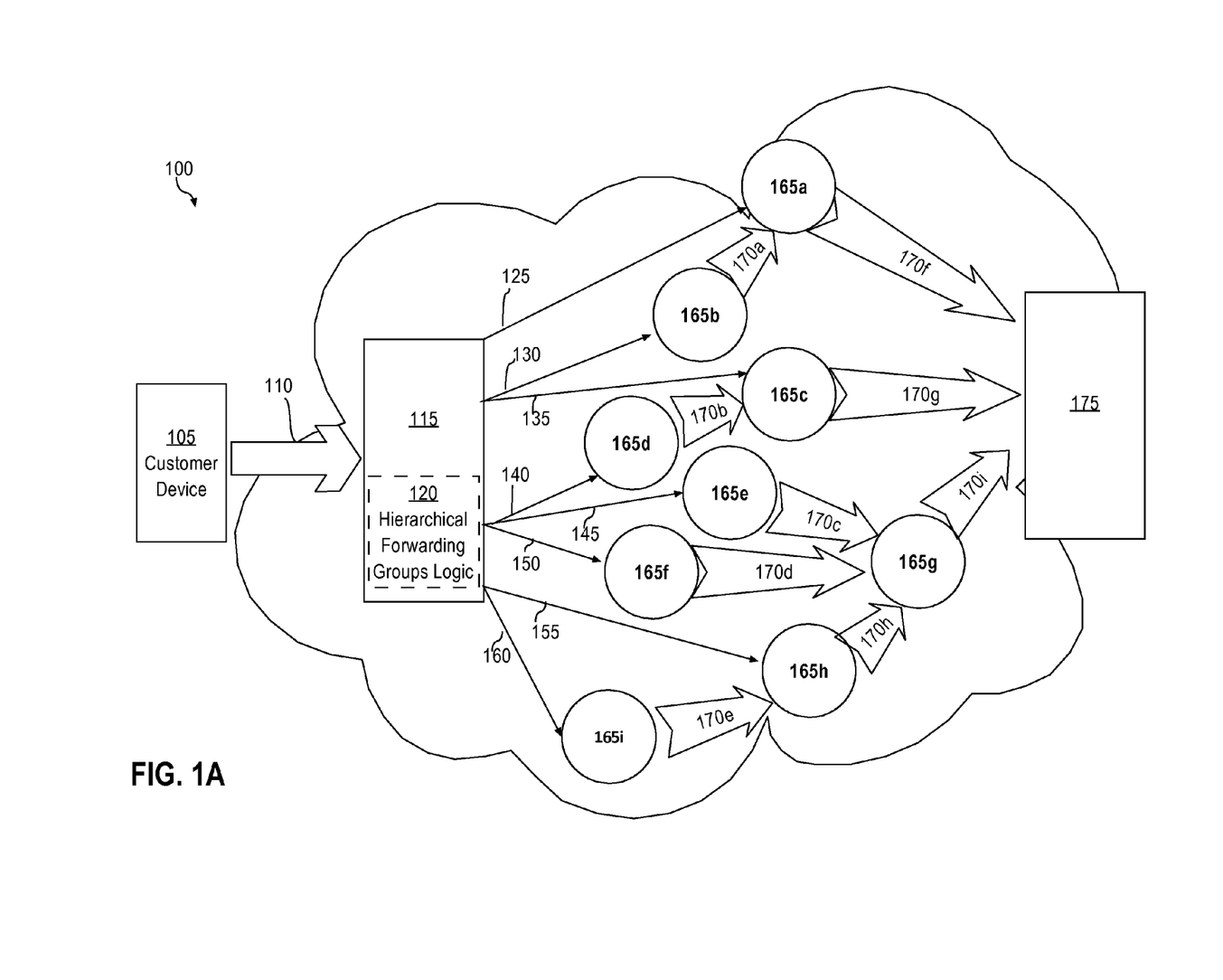
FIG. 1A illustrates an example networking arrangement implementing hierarchical forwarding groups at a network node.
Figure 1B:
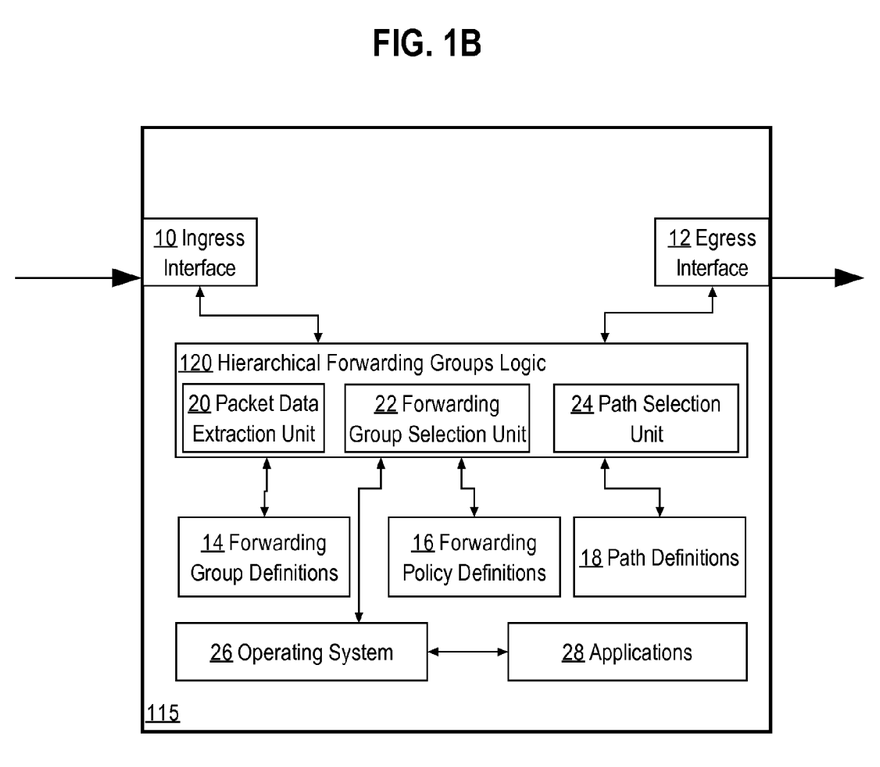
FIG. 1B illustrates functional logic of an embodiment as implemented in a router.

FIG. 1A illustrates an example networking arrangement that depicts a service provider network. FIG. 1B illustrates functional logic of an embodiment as implemented in a router.

In this example, network node 115 is an ingress edge packet router of the service provider that receives traffic 110 from a customer device 105, classifies the traffic based upon hierarchical forwarding groups 120, and forwards the traffic to a destination via one or more paths 125, 130, 135, 140, 145, 150, 155, 160 associated with network node 115. Network nodes 165*a*, 165*b*, 165*c*, 165*d*, 165*e*, 165*f*, 165*g*, 165*h*, 165*i*, are transit packet routers in this example, and paths 170*a*, 170*b*, 170*c*, 170*d*, 170*e*, 170*f*, 170*g*, 170*h*, 170*i* enable the service provider to carry traffic 110 to network node 175, which is an egress edge packet router.

In the example depicted in FIG. 1A, implementation of hierarchical forwarding groups is not limited to only the ingress edge packet router. Hierarchical forwarding groups may be implemented at any networking node of the service provider to maintain the network's efficiency and robustness and/or satisfy any customer expectations. For instance, in the example depicted in FIG. 1A, hierarchical forwarding groups may be implemented at any of the transit packet routers 165*a*, 165*b*, 165*c*, 165*d*, 165*e*, 165*f*, 165*g*, 165*h*, 165*i*. Additionally, hierarchical forwarding groups are not limited to service provider networks but can be implemented in any network to provide a flexible approach of routing the traffic through the network. Furthermore, network nodes 115, 165*a*, 165*b*, 165*c*, 165*d*, 165*e*, 165*f*, 165*g*, 165*h*, 165*i* and 175, depicted in the example in FIG. 1, can be any type of networking device capable of implementing any mechanism that can help forward a packet to its destination address such as routers, switches, or other internetworking elements. Each of the paths 125, 130, 135, 140, 145, 150, 155, 160 and 170*a*, 170*b*, 170*c*, 170*d*, 170*e*, 170*f*, 170*g*, 170*h*, 170*i*, in FIG. 1A, can be any type of communication medium capable of carrying packets from one network node to another.

Referring now to FIG. 1B, functional logic of an embodiment as implemented in a router may comprise hierarchical forwarding groups logic 120 coupled to an ingress interface 10 and an egress interface 12. Packet flows may be received at ingress interface 10 and forwarded using egress interface 12; there may be any number of ingress interfaces and egress interfaces associated with hierarchical forwarding groups logic 120. Hierarchical forwarding groups logic is not limited to a one-to-one association with a particular ingress or egress interface. In some embodiments, selection of one of a plurality of egress interfaces associated with hierarchical forwarding groups logic 120 may be performed.

In an embodiment, hierarchical forwarding groups logic 120 comprises a packet data extraction unit 20, a forwarding group selection unit 22, and a path selection unit 24. In an embodiment, the packet data extraction unit 20 is configured to copy or read data values in headers of packets received on ingress interface 10 for use in forwarding decisions, as further described herein. In an embodiment, forwarding group selection unit 22 is configured to select forwarding groups based on the data obtained from packet data extraction unit 20, and the path selection unit 24 is configured to select a path based on the selected forwarding groups, forwarding group definitions 14, and path definitions 18. These operations are described further herein in connection with FIG. 4 and other drawings.

In an embodiment, hierarchical forwarding groups logic 120 is coupled to or can access and store forwarding group definitions 14, forwarding policy definitions 16, and path definitions. In an embodiment, each of the forwarding group definitions 14, forwarding policy definitions 16, and path definitions may be stored in non-volatile memory or volatile memory of the network node 115. The hierarchical forwarding groups logic 120 may be coupled to an operating system 26 and one or more other applications 28 that may implement various internetworking functions. For example, applications 28 may implement Border Gateway Protocol (BGP) and Label Distribution Protocol (LDP) or other label switching functions.

Figure 2A:
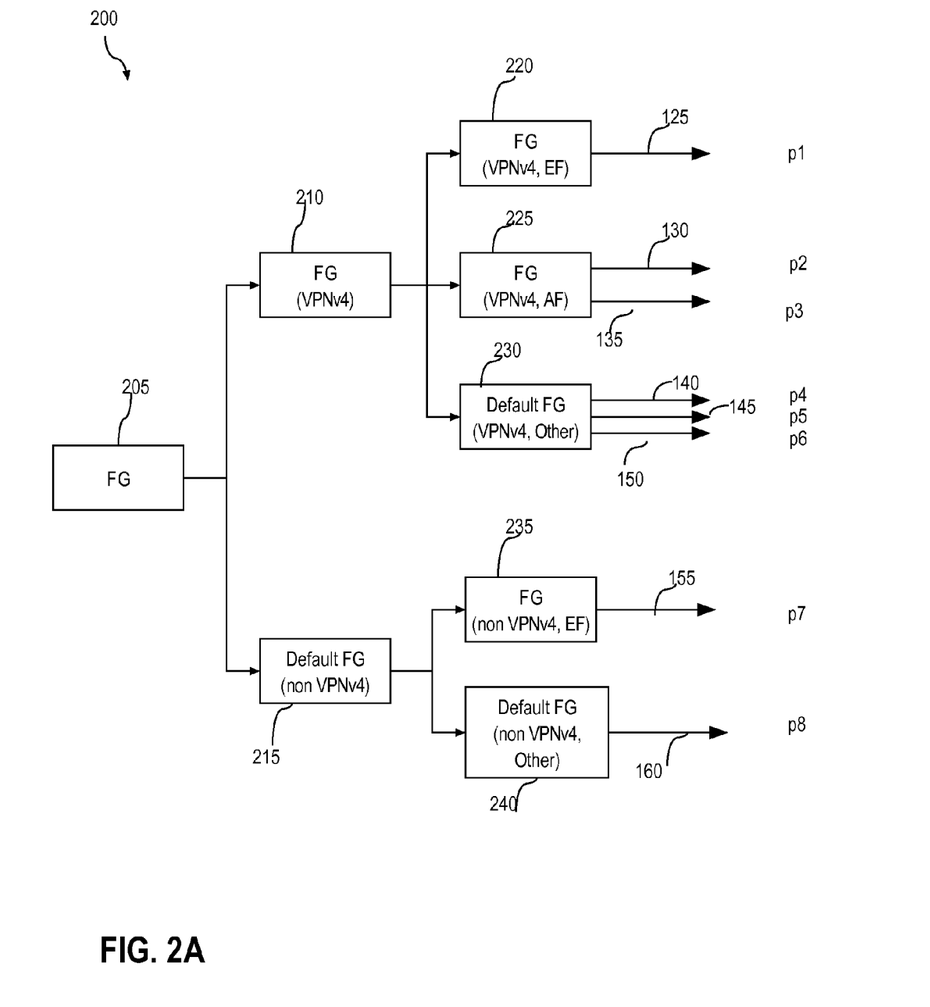
FIG. 2A illustrates an embodiment of hierarchical forwarding groups.

FIG. 2A illustrates example of hierarchical forwarding groups that may be implemented within the network node 115. Forwarding groups 210, 215 may be configured as members of forwarding group 205 using configuration commands directed to forwarding group logic in the network node 115. Forwarding groups 220, 225, 230 may be configured as members of forwarding group 210. Forwarding groups 235, 240 may be configured as members of forwarding group 215. Forwarding groups 210, 215 are at the same level of a hierarchy. Forwarding groups 220, 225, 230, 235, 240 are at the same level of the hierarchy, which is different from the level of hierarchy to which forwarding groups 210 and 215 belong. Forwarding group 205 is a root forwarding group, which comprises of forwarding groups 210, 215, 220, 225, 230, 235, 240 as its members.

Forwarding groups may be associated with one or more paths. For example in FIG. 2A, forwarding group 220 is associated with path 125. Forwarding group 225 is associated with paths 130, 135. Forwarding group 230 is associated with paths 140, 145, 150. Forwarding group 235 is associated with path 155. Forwarding group 240 is associated with path 160. Paths 125, 130, 135, 140, 145, 150 are also associated with forwarding group 210 since forwarding groups 220, 225, 230 are members of forwarding group 210.

Similarly forwarding group 205 is associated with paths 125, 130, 135, 140, 145, 150, since forwarding group 210 is a member of forwarding group 205. Paths 155, 160 are associated with forwarding group 215 through the membership of forwarding groups 235 and 240. Paths 155, 160 are also associated with forwarding group 205 through forwarding group 215.

As described herein, a forwarding group is a logical unit established in computer memory of a packet routing node which, when processed using forwarding group logic, enables the routing node to select a particular path through which to forward a packet based on a forwarding policy associated with the forwarding group. A forwarding policy may be a set of rules stored in computer memory that specify a forwarding group member based on information or values that is used to classify traffic flowing through the network. The classification information may be related to control plane data, data plane data or management plane architecture data of a network node. A forwarding group member may be a forwarding group configured to be a member of another forwarding group. For example, in FIG. 2A, forwarding groups 210, 215 are forwarding group members of forwarding group 205. Forwarding groups 220, 225, 230 are forwarding group members of forwarding group 210, and forwarding groups 235, 240 are forwarding group members of forwarding group 215. In an embodiment, forwarding policies associated with different forwarding groups at the same level of hierarchy may specify the next-level forwarding groups based on the same type of data. For example, in FIG. 2A, forwarding group 210 and forwarding group 215 both select next-level forwarding groups based on data plane data.

In an embodiment, in cooperation with the forwarding logic, the forwarding group associated with a forwarding policy selects a forwarding group member based on the forwarding group member specified in the policy. If the selected forwarding group member is associated with one path, then the network node may forward the packet via that particular path. In one embodiment, more than one path may be associated with a particular forwarding group and the network node, may forward traffic to different paths for purposes of load balancing according to a particular load balancing policy, using some or all paths associated with a forwarding group.

In an embodiment, one of the forwarding group members of a particular forwarding group may be designated as the default forwarding group. For example, in FIG. 2A, forwarding group 215, one of the forwarding group members of forwarding group 205, may be designated as a default forwarding group. Similarly, forwarding group 230, one of the forwarding group members of forwarding group 210 may be designated as a default forwarding group, and forwarding group 240, one of the forwarding group members of forwarding group 215, may be designated as a default forwarding group. A path associated with a default forwarding group is referred to as default path. A default forwarding group may be associated with one or more default paths. Packets may be forwarded via a default path if the forwarding group member specified by a forwarding policy is unavailable. In this context, "unavailable" means that no path associated with a particular forwarding group is available.

A forwarding policy may be a control plane, data plane or management plane policy. A control plane forwarding policy may be a set of user-defined rules that specify a forwarding group member based on information related to control plane architecture of the network node that can be used to classify traffic. The control plane policy may indicate that the particular forwarding group member corresponds to the incoming packet based on the control plane forwarding policy.

An example of information available in the control plane architecture of a network node that can be used to classify traffic is an address family of certain destination addresses, such as VPNv4 or IPv4, stored in the BGP route tables of a network node implementing BGP protocol. In one embodiment, a control plane forwarding policy may specify a particular forwarding group for a group of address families stored in the BGP route tables. In some other embodiments, a control plane forwarding policy may specify a particular forwarding group for one or more BGP communities, or for one or more AS Paths.

A data plane forwarding policy may be a set of rules that specify a forwarding group member based on a value in one or more fields of a packet. For example, a set of rules of a data plane forwarding policy matching on the Differentiated Services field or DS field. A data plane forwarding policy may specify using one forwarding group member if any of a set of various values appears in one or more fields of a packet. For example, in one embodiment, a data plane forwarding policy may specify a particular forwarding group member if a particular Expedited Forwarding (EF) value appears in the DS field of a packet. In another embodiment, a data plane forwarding policy may specify the same forwarding group member if any of a plurality of different Assured Forwarding (AF) values appear in the DS field of a packet. In yet another embodiment, a data plane forwarding policy may specify using a forwarding group member if any of a plurality of different values appear in DiffServ codepoints, source address, packet size or other fields of a packet.

A management plane forwarding policy may be a set of rules that specify a forwarding group member based on information related to the management plane of the communication architecture of a network node. An example of information related to the management plane is information related to connectivity of paths to other network nodes in the network. Another example of information related to the management plane is information related to performance issues related to any process in the network node or the network node in general.

An embodiment of using control plane and data plane forwarding policies associated with different hierarchy levels of hierarchical forwarding groups may be understood with reference to in FIG. 2A. A forwarding group 205 is associated with a control plane forwarding policy that specifies, as forwarding group members, forwarding group 210 for any destination address that belongs to address family VPNv4, and forwarding group 215 for all destination addresses that do not belong to the VPNv4 address family. The forwarding group 210 may be associated with a data plane forwarding policy that specifies, as forwarding group members of forwarding group 210, forwarding group 220 for any packet that has an expedited forwarding (EF) value in the DS field of the packet, forwarding group 225 for an assured forwarding (AF) value in the DS field, and forwarding group 230 for values that are neither an EF nor an AF value.

A data plane policy associated with forwarding group 215 may specify, as forwarding group members of forwarding group 215, forwarding group 235 for any packet that has an EF value in the DS field, and forwarding group 240 for all packets that do not have an EF value in the DS field.

Figure 2B:
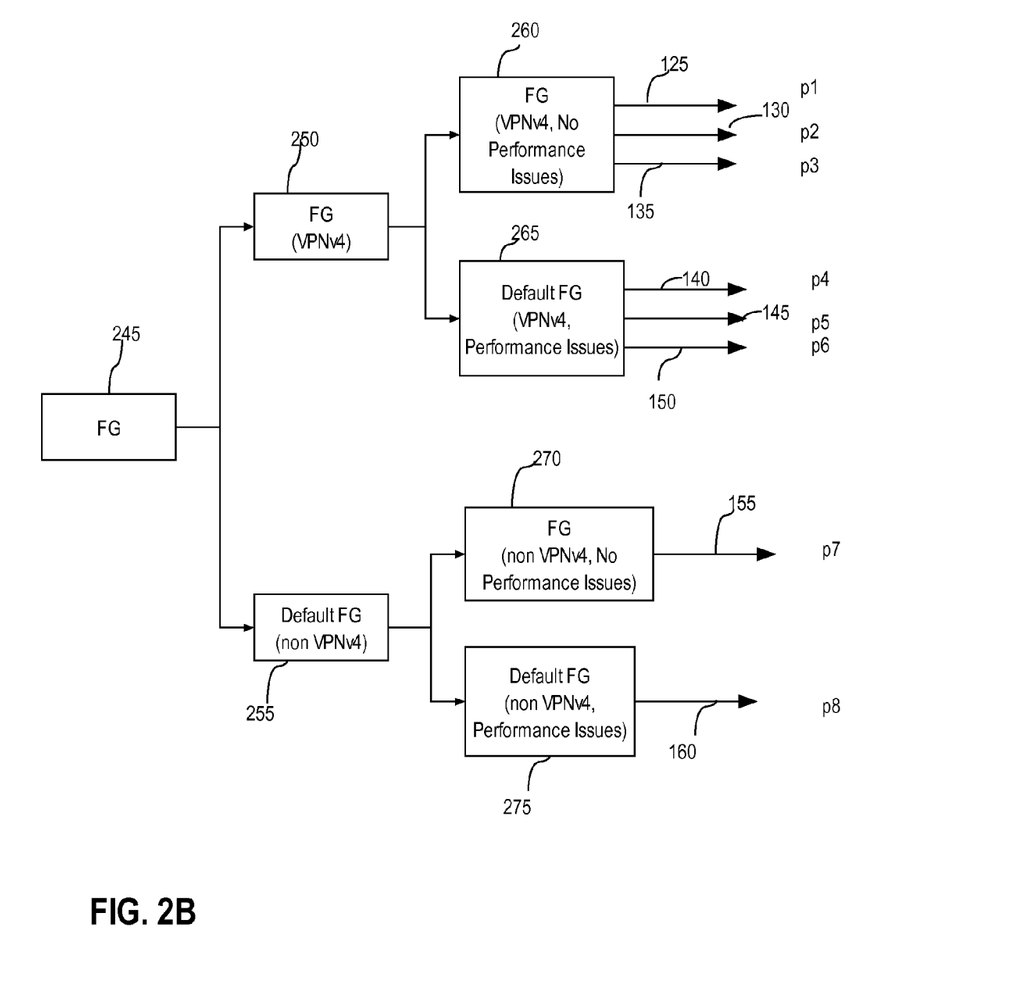
FIG. 2B illustrates another embodiment of hierarchical forwarding groups.

FIG. 2B illustrates an embodiment of hierarchical forwarding groups with control plane and management plane forwarding policies associated at different hierarchy levels.

In FIG. 2B, forwarding group 245 is associated with control plane forwarding policy that may specify, as forwarding group members, forwarding group 250 for any destination address that belongs to VPNv4 address family, and forwarding group 255 for all destination addresses that do not belong to the VPNv4 address family.

Forwarding group 250 is associated with a management plane forwarding policy that may specify, as forwarding group members, forwarding group 260 if the network node is not experiencing any performance issues and forwarding group 270 if the performance of the network node falls below a certain threshold value, which indicates that the performance of the network node has degraded severely. Similarly, forwarding group 255 is also associated with a management plane forwarding policy that may specify, as forwarding group members, forwarding group 270 if the performance of the network node is not affected and forwarding group 275 if the network node's performance has been degraded beyond the certain threshold value.

In an embodiment, forwarding groups 215, 230 and 240, in FIG. 2A, are designated as default forwarding groups at their respective hierarchy level. For example, if forwarding group 210 is unavailable for some reason, then forwarding group 215 should be selected and then, based upon the forwarding policy associated with forwarding group 215, either forwarding group 235 or 240 should be selected. Similarly, if forwarding group 220 or 225 is unavailable, then forwarding group 230 should be selected. If forwarding group 235 is unavailable, then forwarding group 240 should be selected.

In another embodiment, forwarding groups 255, 265, 275 in FIG. 2B are designated as default forwarding groups at their respective hierarchy level. For example, if forwarding group 250 is unavailable for some reason, then forwarding group 255 should be selected and then, based upon the forwarding policy associated with forwarding group 255, either forwarding group 270 or 275 should be selected. Similarly, if forwarding group 260 is unavailable, then forwarding group 265 should be selected. If forwarding group 270 is unavailable, then forwarding group 275 should be selected.

Figure 3:
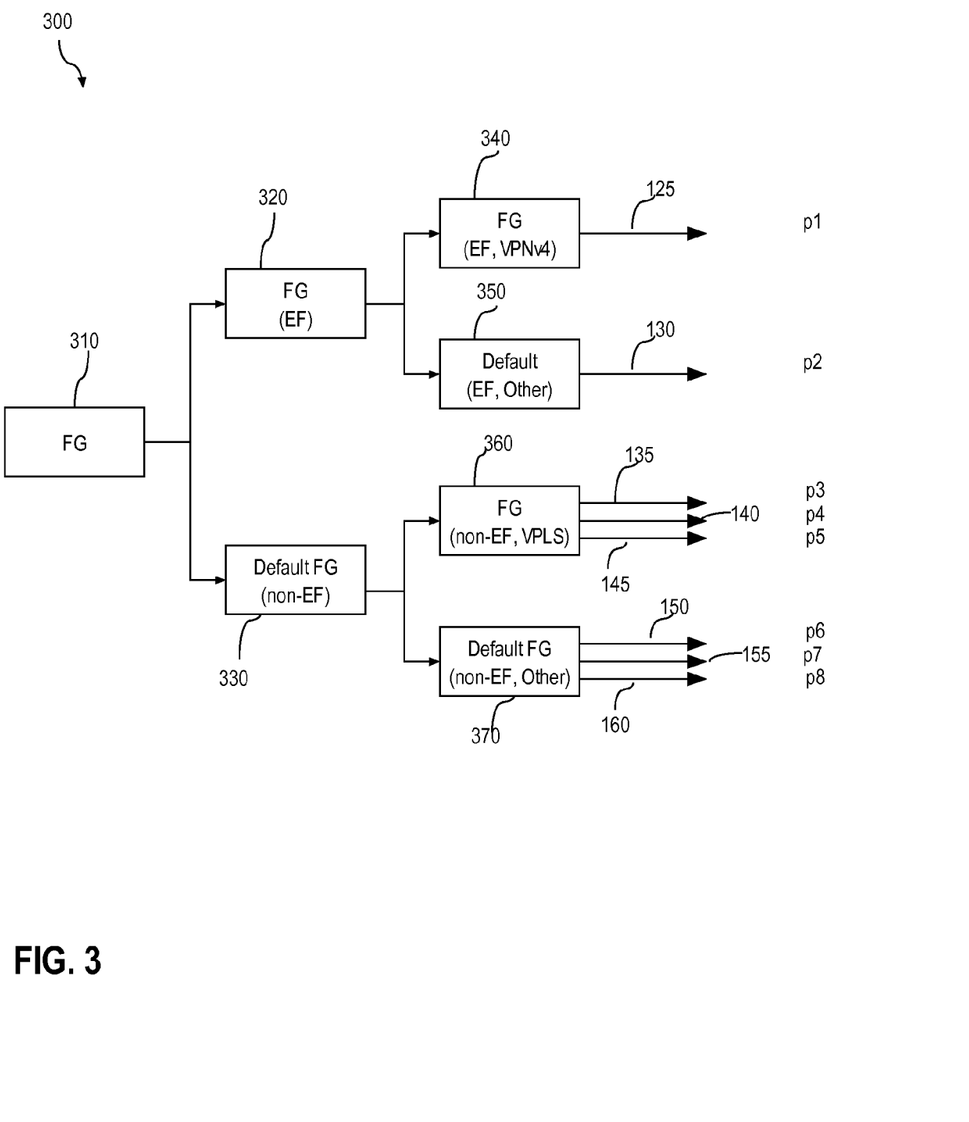
FIG. 3 illustrates another embodiment of hierarchical forwarding groups.

FIG. 3 illustrates another embodiment of hierarchical forwarding groups using the same eight paths, 125, 130, 135, 140, 145, 150, 155, 160, as used in the embodiment of hierarchical forwarding groups of FIG. 2A and FIG. 2B, in which data plane policy is applied first and control plane policy is applied second. In FIG. 3, forwarding groups 320, 330 are configured to be members of forwarding group 310. Forwarding groups 340, 350 are configured as members of forwarding group 320 and forwarding groups 360, 370 are configured as members of forwarding group 330. Forwarding groups 320, 330 are at the same hierarchy level and forwarding groups 340, 350, 360, 370 are at the same hierarchy level. Path 125 is associated with forwarding group 340 and path 130 is associated with forwarding group 350. Paths 135, 140, 145 are associated with forwarding group 360. Paths 150, 155, 160 are associated with forwarding group 370. Forwarding groups 330, 350, 370 are designated as the default forwarding groups for this embodiment of hierarchical forwarding groups.

Forwarding group 310 is associated with a data plane forwarding policy that specifies forwarding group 320 for packets containing EF value in the DS field, and forwarding group 330 for all packets that do not contain EF value in the DS field. Forwarding groups 320 and 330 are associated with control plane forwarding policies. Control plane forwarding policy associated with forwarding group 320 specifies, as forwarding group members: (1) forwarding group 340 for all packets with a destination address belonging to VPNv4 address family, and (2) forwarding group 350 for all packets with a destination address that does not belong to the VPNv4 address family. The control plane forwarding policy associated with forwarding group 330 specifies as forwarding group members: (1) forwarding group 360 for all packets with a destination address belonging to VPLS address family, and (2) forwarding group 370 for all packets that do not belong to the VPLS address family.

Packets may be routed differently, using the same set of paths, based on which forwarding policies are implemented at which forwarding groups. For example, the arrangements illustrated in FIG. 2A and FIG. 3 both forward via the same set of paths of paths 125, 130, 135, 140, 145, 150, 155, 160 but in FIG. 2A control plane forwarding policy is implemented at the first level consisting of forwarding group 205 and in FIG. 3, a data plane policy is implemented at the first level consisting of forwarding group 310. Thus, a packet which does not have a destination address belonging to a VPNv4 address family but has an EF value in the DS field will be forwarded via path 155 in FIG. 2A and via path 130 in FIG. 3.

3.0 Method of Routing Packet Traffic Using Hierarchical Forwarding Groups

Figure 4:
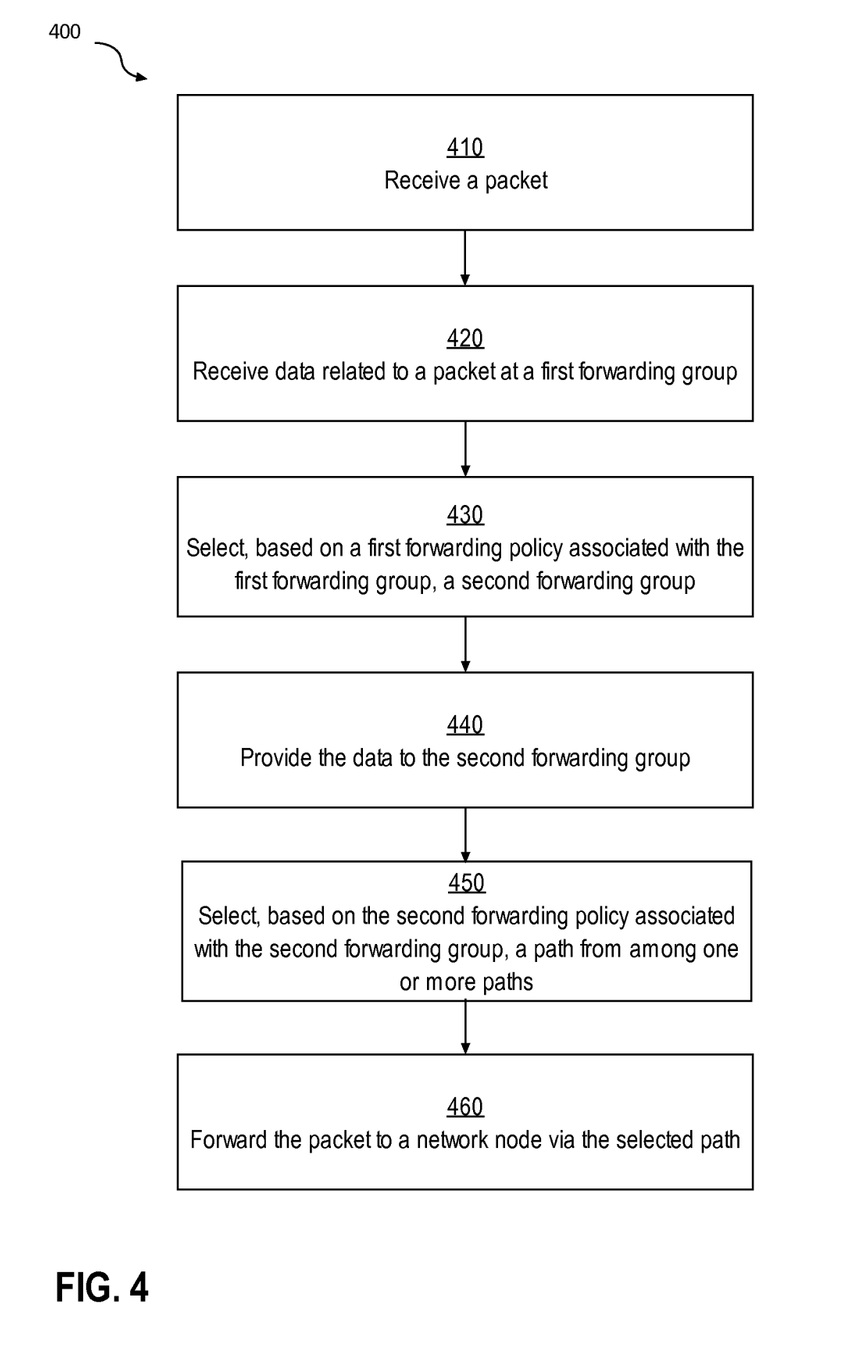
FIG. 4 illustrates a method for forwarding a packet via a particular path based on hierarchical forwarding groups.

FIG. 4 illustrates an example method 400 of routing packets using hierarchical forwarding groups. The steps of FIG. 4 may be performed at a single network node such as a packet router.

In step 410 a packet is received at a network node implementing hierarchical forwarding groups. In step 420, data related to the packet is received at a first forwarding group. Data related to the packet may comprise of some or all attributes, of the packet, necessary for a forwarding group to analyze the associated forwarding policies and select the specified forwarding group member. In one embodiment, the data related to a packet may be contained within the packet, such as, but not limited to, the value in the DS field or the destination address. In another embodiment, the data related to a packet may be separate from the packet. For example, the data related to the packet may be stored at the network node.

In step 430, the process selects a second forwarding group, by analyzing a forwarding policy associated with the first forwarding group. In one embodiment, the second forwarding group may belong to a set of forwarding groups that have been configured as members of the first forwarding group. In another embodiment, each forwarding group from the set of forwarding groups that are members of the first forwarding group is associated with a set of unique paths. In another embodiment, process may determine that no path associated with second forwarding group is available, and therefore selects a forwarding group designated as default forwarding group.

Once the second forwarding group is selected, at step 440, the first forwarding group provides the data related to the packet, to the second forwarding group. In some embodiments, the first forwarding group may pass all attributes that have been provided to the first forwarding group to the second forwarding group. In other embodiments, the first forwarding group may only pass attributes that may be used by the second forwarding group to analyze its associated forwarding policy and to select the forwarding group member specified by its associated forwarding policy.

In step 450 the process selects a path from among one or more paths by analyzing a second forwarding policy associated with the second forwarding group. In step 460, the process forwards the packet to a network node via the selected path. In one embodiment, more than one path may be associated with a second forwarding group. In such an embodiment, a load balancing forwarding policy, applied across all paths associated with the second forwarding group, may be used to forward the packet via one of the associated paths.

In other embodiments, the second forwarding group may be configured to have other forwarding groups as members since hierarchical forwarding groups may be implemented with any number of hierarchy levels.

As a result, using these techniques, for example, in a set of equal cost paths, configuration data can define a hierarchy of forwarding groups where each group includes one or more paths or forwarding groups. At each level in the hierarchy, the forwarding group members are selected based upon control plane, data plane, or management plane values. Different planes can be used at different levels of the hierarchy to select the forwarding group members, and there is no limit on the hierarchy levels. Embodiments enable establishing complex forwarding policies to select between multiple explicitly routed paths, such as traffic engineered label switched paths or segment routing paths, which have equal cost from a routing perspective but which have different performance characteristics in terms of latency, protection level, or reliability. Embodiments also enable establishing complex forwarding policies to select between various packet encapsulation options including, but not limited to, GRE, L2TPv3. Embodiments also enable selecting between various paths based on signaling protocols for paths such as LDP signaled paths or RSVP-TE signaled paths. For example, when a service provider wishes to forward traffic using a plurality of different tunnel types based upon service type or class of service, hierarchical forwarding groups facilitate flexible definition of custom forwarding policies.

4.0 Other Disclosure

The disclosure also encompasses the subject matter set forth in the following numbered clauses:

1. A non-transitory computer-readable storage medium storing one or more sequences of instructions, which when executed by one or more processors, cause the one or more processors to perform: receiving a packet; receiving data related to the packet at a first forwarding group, wherein the first forwarding group is a forwarding group member at a first level of a hierarchy of forwarding groups; selecting, based on a first forwarding policy associated with the first forwarding group, a particular second forwarding group from a set of forwarding groups that are members of the first forwarding group; wherein each forwarding group of the set of forwarding groups is associated with a unique set of paths; wherein the particular second forwarding group is a forwarding group member at a second hierarchical level of the hierarchy of forwarding groups that is different from the first hierarchical level of the hierarchy forwarding groups; providing the data to the particular second forwarding group; selecting, based on a second forwarding policy associated with the particular second forwarding group, a particular path from a set of paths that are associated with the particular second forwarding group; forwarding the packet to a network node via the selected path.

2. The non-transitory computer-readable storage medium of clause 1, wherein the second forwarding policy is different from the first forwarding policy.

3. The non-transitory computer-readable storage medium of clause 1, wherein the first forwarding policy is a control plane policy and the second forwarding policy is a data plane policy.

4. The non-transitory computer-readable storage medium of clause 1, wherein the first forwarding policy is a data plane policy and the second forwarding policy is a control plane policy.

5. The non-transitory computer-readable storage medium of clause 1, wherein the first forwarding policy is a management plane policy and the second forwarding policy is a data plane policy.

6. The non-transitory computer-readable storage medium of clause 1, wherein the first forwarding policy is a data plane policy and the second forwarding policy is a management plane policy.

7. The non-transitory computer-readable storage medium of clause 1, wherein the first forwarding policy is a management plane policy and the second forwarding policy is a control plane policy.

8. The non-transitory computer-readable storage medium of clause 1, wherein the first forwarding policy is a control plane policy and the second forwarding policy is a management plane policy.

9. The non-transitory computer-readable storage medium of clause 1, further comprising sequences of instructions which, when executed, cause the one or more processors to perform: determining, availability of any path from the unique set of paths associated with the particular second forwarding group; in response to determining that the path associated with the particular second forwarding group is unavailable, selecting the default forwarding group from the set of forwarding groups that are members of the first forwarding group.

10. The non-transitory computer-readable storage medium of clause 1, wherein the particular second forwarding group is associated with both a first path and a second path and further comprising sequences of instructions which, when executed, cause the one or more processors to perform: selecting, based on a load balancing policy associated with the particular second forwarding group, either the associated first path or the associated second path; forwarding the packet to the network node via the selected path.

5.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
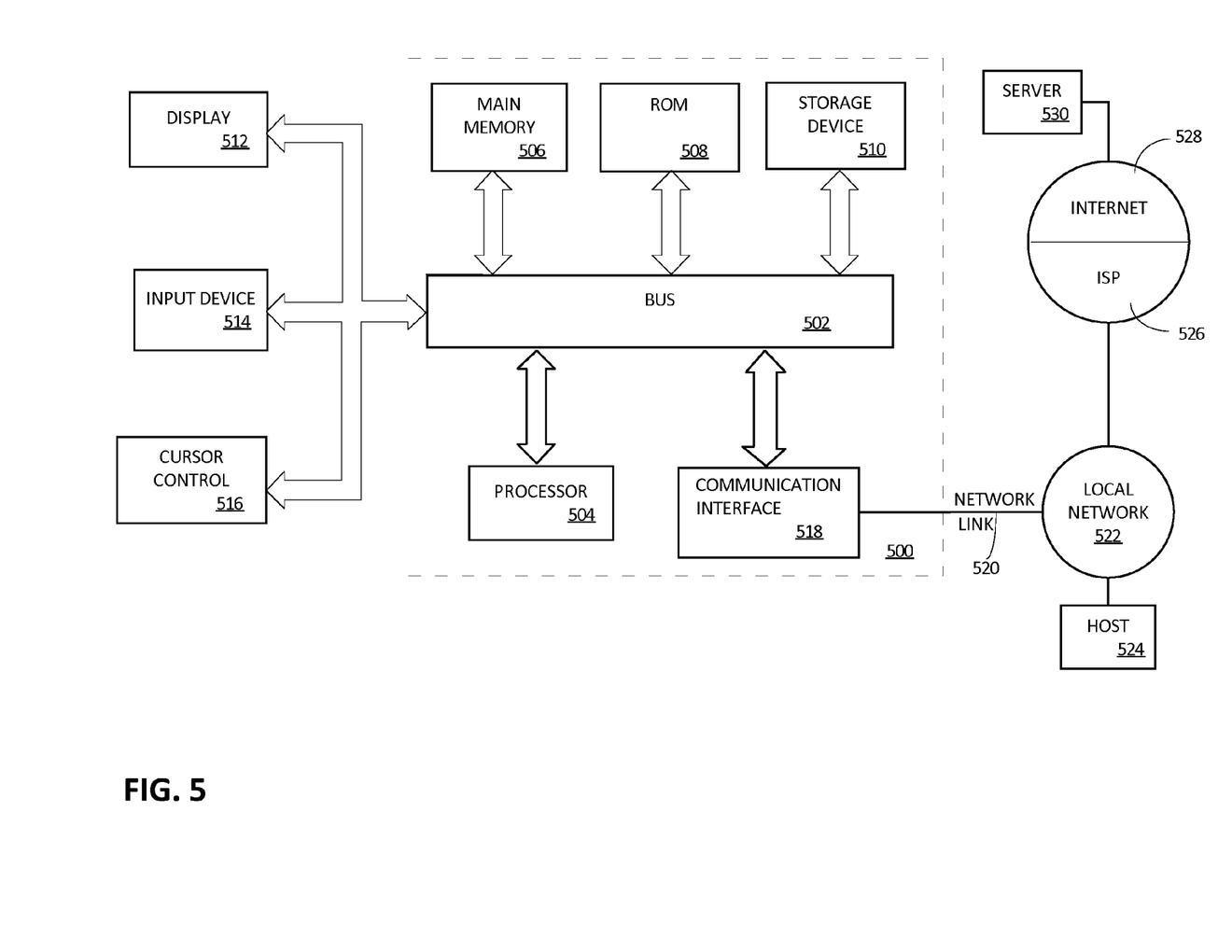
FIG. 5 illustrates a system upon which an embodiment may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
at a packet router:
receiving a packet;
receiving data related to the packet at a first forwarding group, wherein the first forwarding group is a forwarding group member at a first hierarchical level of a hierarchy of forwarding groups and is configured to select another forwarding group at another hierarchical level rather than a forwarding path;
selecting, based on data of a first type included in the data and a first forwarding policy associated with the first forwarding group, a particular second forwarding group from a set of forwarding groups that includes the first forwarding group and repeating the selecting one or more times for a plurality of different second forwarding groups at different successive levels of the hierarchy of forwarding groups;
wherein each forwarding group of the set of forwarding groups is associated with one or more paths;
wherein the particular second forwarding group is a forwarding group member at a second hierarchical level, of the hierarchy of forwarding groups, that is different from the first hierarchical level of the hierarchy of forwarding groups and is configured to select a forwarding path rather than another forwarding group at another hierarchical level of the hierarchy of forwarding groups;
providing at least a portion of the data to the particular second forwarding group;
selecting, based on data of a different second type included in the portion of the data and a second forwarding policy associated with the particular second forwarding group, a particular path from a set of paths that are associated with the particular second forwarding group;
forwarding the packet to a network node via the particular path.

2. The computer-implemented method of claim 1, wherein the second forwarding policy is different from the first forwarding policy.

3. The computer-implemented method of claim 1, wherein the first forwarding policy is a control plane policy and the second forwarding policy is a data plane policy.

4. The computer-implemented method of claim 1, wherein the first forwarding policy is a data plane policy and the second forwarding policy is a control plane policy.

5. The computer-implemented method of claim 1, wherein the first forwarding policy is a management plane policy and the second forwarding policy is a data plane policy.

6. The computer-implemented method of claim 1, wherein the first forwarding policy is a data plane policy and the second forwarding policy is a management plane policy.

7. The computer-implemented method of claim 1, wherein the first forwarding policy is a management plane policy and the second forwarding policy is a control plane policy.

8. The computer-implemented method of claim 1, wherein the first forwarding policy is a control plane policy and the second forwarding policy is a management plane policy.

9. The computer-implemented method of claim 1, further comprising:

receiving a second packet;
selecting, based on the first forwarding policy the particular second forwarding group;
determining, availability of any path from the set of paths associated with the particular second forwarding group;
in response to determining that no path associated with the particular second forwarding group is available, selecting a default forwarding group from the set of forwarding groups that includes the first forwarding group;
forwarding the second packet to a second network node via one of default set of paths associated with the default forwarding group.

10. The computer-implemented method of claim 1, wherein the particular second forwarding group is associated with both a first path and a second path;
the method further comprising:
selecting, based on a load balancing policy associated with the particular second forwarding group, either the associated first path or the associated second path;
forwarding the packet to the network node via the selected path.

11. The computer-implemented method of claim 1, wherein the packet router is a label switch router.

12. A packet router comprising:
one or more network interfaces that are configured to be coupled to a data network for receiving one or more packet flows therefrom;
one or more processors;
one or more stored sequence of instructions which, when executed by the one or more processors, cause the one or more processors to perform:
receiving a packet;
receiving data related to the packet at a first forwarding group, wherein the first forwarding group is a forwarding group member at a first hierarchical level of a hierarchy of forwarding groups and is configured to select another forwarding group at another hierarchical level rather than a forwarding path;
selecting, based on data of a first type included in the data and a first forwarding policy associated with the first forwarding group, a particular second forwarding group from a set of forwarding groups that includes the first forwarding group and repeating the selecting one or more times for a plurality of different second forwarding groups at different successive levels of the hierarchy of forwarding groups;
wherein each forwarding group of the set of forwarding groups is associated with one or more paths;
wherein the particular second forwarding group is a forwarding group member at a second hierarchical level, of the hierarchy of forwarding groups, that is different from the first hierarchical level of the hierarchy of forwarding groups and is configured to select a forwarding path rather than another forwarding group at another hierarchical level of the hierarchy of forwarding groups;
providing at least a portion of the data to the particular second forwarding group;
selecting, based on data of a different second type included in the portion of the data and a second forwarding policy associated with the particular second forwarding group, a particular path from a set of paths that are associated with the particular second forwarding group;
forwarding the packet to a network node via the particular path.

13. The packet router recited in claim 12, wherein the second forwarding policy is different from the first forwarding policy.

14. The packet router recited in claim 12, wherein the first forwarding policy is a control plane policy and the second forwarding policy is a data plane policy.

15. The packet router recited in claim 12, wherein the first forwarding policy is a data plane policy and the second forwarding policy is a control plane policy.

16. The packet router recited in claim 12, wherein the first forwarding policy is a management plane policy and the second forwarding policy is a data plane policy.

17. The packet router recited in claim 12, wherein the first forwarding policy is a data plane policy and the second forwarding policy is a management plane policy.

18. The packet router recited in claim 12, wherein the first forwarding policy is a management plane policy and the second forwarding policy is a control plane policy.

19. The packet router recited in claim 12, wherein the first forwarding policy is a control plane policy and the second forwarding policy is a management plane policy.

20. The packet router recited in claim 12, further comprising sequences of instructions which, when executed, cause the one or more processors to perform:

receiving a second packet;

selecting, based on the first forwarding policy the particular second forwarding group;

determining, availability of any path from the set of paths associated with the particular second forwarding group;

in response to determining that no path associated with the particular second forwarding group is available, selecting a default forwarding group from the set of forwarding groups that includes the first forwarding group;

forwarding the second packet to a second network node via one of default set of paths associated with the default forwarding group.

21. The packet router recited in claim 12, wherein the particular second forwarding group is associated with both a first path and a second path and further comprising sequences of instructions which, when executed, cause the one or more processors to perform:

selecting, based on a load balancing policy associated with the particular second forwarding group, either the associated first path or the associated second path;

forwarding the packet to the network node via the selected path.

22. The packet router recited in claim 12, wherein the packet router is a label switch router.

* * * * *